United States Patent [19]

Dennhoven et al.

[11] 4,139,771
[45] Feb. 13, 1979

[54] DEVICE FOR EXAMINING LUGGAGE BY MEANS OF X-RAYS

[75] Inventors: Manfred Dennhoven, Wiesbaden; Claus Kunze, Taunusstein; Rainhard Kuehn, Wiesbaden, all of Fed. Rep. of Germany

[73] Assignee: Heimann GmbH, Berlin & Munich, Fed. Rep. of Germany

[21] Appl. No.: 649,662

[22] Filed: Jan. 16, 1976

[30] Foreign Application Priority Data

Jul. 18, 1975 [DE] Fed. Rep. of Germany ....... 2532300

[51] Int. Cl.$^2$ ............................................. G01N 23/22
[52] U.S. Cl. ..................................... 250/408; 250/460
[58] Field of Search ........................ 250/409, 408, 460

[56] References Cited
U.S. PATENT DOCUMENTS 3,567,854  3/1971  Tschantz .............................. 250/409
3,808,444  4/1974  Schneeberger ...................... 250/460
3,924,133  12/1975 Reiss .................................... 250/408

Primary Examiner—Harold A. Dixon
Attorney, Agent, or Firm—Hill, Gross, Simpson, Van Santen, Steadman, Chiara & Simpson

[57] ABSTRACT

A luggage inspection apparatus utilizing fluoroscopic examination in conjunction with an X-ray generator, with the fluoroscopic picture being received by a TV camera, the video signals of which are supplied to an intermediate store for ultimate supply to a TV monitor, the camera containing an AC line-coupled pulse generator for synchronizing the camera and the X-ray flash generator, which pulse generator is electrically interconnected with a synchronizing unit which, upon the initiating of a starting pulse, thus likewise synchronously triggers the X-ray flash generator with respect to the AC supply line.

14 Claims, 6 Drawing Figures

DEVICE FOR EXAMINING LUGGAGE BY MEANS OF X-RAYS

BACKGROUND OF THE INVENTION

The invention relates to a device for use in the inspection of luggage and the like by means of X-rays, in which rays from an X-ray flash generator are directed through the object to be inspected, to produce a shadow image on a fluorescent screen, which image is received by a TV camera, the video signals of which are supplied to an intermediate store. The video signals may then be supplied to a TV monitor. The X-ray flash generator, TV camera and intermediate store are operatively connected with one another over a suitable control unit.

The increase in terrorist attacks on installations of all types, in particular on airplanes and at airports, necessitates security measures in which a careful check of persons and their baggage is consummated. While a manual search is practical insofar as the quality of the inspection is concerned, it is time consuming and has the associated unpleasantness of necessitating the opening, examining and frequently rearranging of the contents of the luggage. Fluoroscoping by means of X-rays presents a quick and sure examination of luggage as to weapons, ammunition and the like, but in such process other problems arise and must be considered, in particular the problem with respect to the environment and the baggage contents, for example, film which must not be endangered or damaged by X-rays.

A method and device for revealing dangerous objects and/or valuable metals or the like by means of X-rays, whereby an object is radiated with X-rays which, following penetration through the object involved, are suitably collected to effect a visible reproduction, is for example, illustrated in U.S. Pat. No. 3,844,816. The method involved is characterized in that by means of accelerated electron beam, an anticathode is constantly scanned or is irradiated in a coarse pattern by means of focal spot scanning and the X-rays produced in such manner are directed at an object. In addition that part of the object having a comparatively high X-ray absorption is monitored by means of the collected X-rays and an exact X-ray permeability image of the part of the object with comparatively high X-ray absorption is produced. In addition to the fact that in this known method, with a constant scanning, either film damage or an extremely fuzzy, unclear pictures must be contended with, an expensive scanning signal generator and/or a transport means for moving the object to be examined at a set speed is required.

U.S. Pat. No. 3,678,278 illustrates another luggage inspection apparatus in which the luggage to be examined is placed in a stationary manner on a platform over which an X-ray shielding hood is moved into place. With the shielding hood in a closed position the piece of luggage is fluoroscoped by means of X-radiation emanating from an X-ray generator to produce a shadow image of the fluoroscoped piece of luggage on a fluorescent screen. With a structure employing a housing of this type, switching means is provided to preclude an operation of the X-ray generator with the shielding hood in open position. In addition, provision is made for enabling the shadow image produced on the fluorescent screen to be observed by means of a connected TV circuit. While this arrangement, on the overall basis, does offer an effective protection of the environment from X-radiation, it operates with a continuous X-radiation which with the necessary intensity for a sufficiently sharp shadow image, leads to film damage, and thus is not film-protective.

In order to limit the damaging influences resulting from X-radiation to a minimum, luggage inspection installations have been produced which operate with flash-type X-ray operation, whereby the X-ray dosage can be limited with respect to both time and intensity, whereby the damaging influences resulting from X-radiation can be limited to a minimum. The shadow image of the inspection object produced by the X-ray flash generator is picked up by the highly sensitive TV camera and entered into a store, from which the shadow image can be read out on a TV monitor for as long a period of observation as desired. Such a system presupposes that the X-ray and the TV camera are precisely synchronously switched on. Heretofore this was possible only with a field emission X-ray flash tube, since only a flash tube of this type is triggerable by the pulse signals of the normal pulse generator of a TV camera. However, field emission X-ray flash tubes have a very short life-span of approximately 2,000 to 30,000 flashes per tube so that the baggage inspections installations of this type imploying an X-ray flash generator have unacceptably high replacement part costs.

BRIEF SUMMARY OF THE INVENTION

The present invention has among its objects the production of baggage inspection installation of very high operating safety and long life-span. Toward this end, the present invention utilizes a TV camera containing a pulse generator synchronized with the alternating current AC supply line and the control unit is a synchronizing unit which rigidly couples the TV camera and the X-ray flash generator with respect to the AC supply voltage. The synchronizing unit, upon the triggering on the start pulse, initially prepares the intermediate store and then triggers the X-ray flash synchronously with the alternating current from the AC supply line.

As a result of the rigid AC coupling, the X-ray flash generator of the present invention is AC triggered synchronously with the pulse generator of the TV camera in the zero passage of the alternating current from the AC supply line. With a AC supply frequency of 50 cycles, the duration of the flash amounts to half a period of the supply voltage, i.e. 10 ms. In order to preclude an overdose of emitted X-rays, for example as a result of disruption or other trouble in the control unit, in accordance with another feature of the invention, an X-ray detector is disposed in the beam path of the X-ray flash generator, which X-ray detector switches off the high voltage of the X-ray flash generator in the event the intensity and/or duration of the flash exceeds a predetermined value for example a radiation duration of 10 ms. In an extremely simple arrangement, the X-ray detector comprises a photo-conductive cell having applied thereto a layer of X-ray sensitive luminescent material, with the photo-conductive cell being disposed directly at the beam outlet opening of the X-ray flash generator. A suitable luminescent material which is responsive to X-radiation is zinc-cadmium sulphide (ZnCdS).

A device in accordance with the present invention preferably employs the completely closed type of construction in which merely the TV monitor is disposed on the top of a housing which contains all of the other components, and which housing shields the environment from X-radiation, while containing an inspection space for receiving the inspection object, and in which the space is completely closed off by a movable shielding hood during the fluoroscoping of the inspection object with X-rays. In this arrangement a so-called full-protection device is achieved which completely protects the health of operating personnel from the hazardous X-radiation. To assure the function of the X-ray flash generator only when the protective shielding housing in fully closed position, preferably switching means is provided, in known manner, on the housing, which switching means precludes any operation of the X-ray flash generator while the inspection space is uncovered. In an especially advantageous form of such switching means, at least one proximity-switch, preferably a gas-protected or so-called reed contact switch may be employed, which is actuated by the closing movement of the shielding hood. Thereby such switch, as a result of the closing motion of the shielding hood, triggers a start pulse at the moment of closure to initiate the inspection operation. Preferably, there is additionally provided a second proximity-switch, likewise preferably a gas-protected contact switch which pevents the supply of high voltage to the X-ray flash generator until just before the final closing of the shielding hood. As a result of the use of the second gas-protected contact, an unintentional triggering of the X-ray flash generator, or one brought about by trouble in the device, is prevented with absolute certainity, whereby the legal requirements for a full-protection device are fully met.

BRIEF DESCRIPTION OF THE DRAWINGS

In the drawings wherein like reference characters indicate like or corresponding parts.

DETAILED DESCRIPTION OF THE INVENTION

Figure 1:
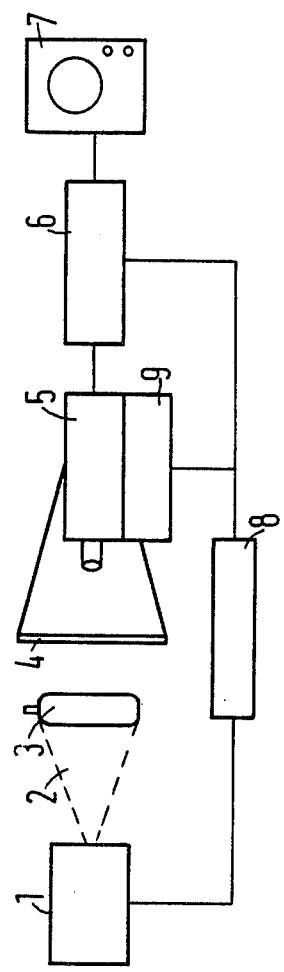
FIG. 1, illustrates in schematic block form the diagram of an inspection device in accordance with the present invention.

Referring to FIG. 1, the reference numeral 1 generally designates an X-ray flash generator whose X-radiation, indicated by the broken lines 2, penetrates an inspection object 3, creating a shadow image of the object on the fluorescent screen 4. Picking up the image from the fluorescent screen 4 is a highly sensitive TV camera tube 5 which is particularly equipped with a so-called EIC camera pick-up tube. The output of the TV camera 5 is supplied to an intermediate store 6, from which a picture taken by the TV camera 5 can be read out on a TV monitor 7 over an extended observation period for example, until another examination operation is triggered. The device is controlled by a control unit 8 which is connected with the X-ray flash generator 1, TV camera 5 and the intermediate store 6.

The X-ray flash generator is operated with AC supply current i.e. 50 cycle alternating current voltage and in order to achieve synchronism between the X-ray flash, whose intensity curve is coupled to the alternating current supply voltage, and the TV signals, the TV camera 5, in accordance with the invention, is provided with an AC-line-coupled pulse generator 9. In this arrangement the control unit 8 is constructed as a synchronizing unit in such a way that when a start pulse is triggered, the intermediate store 6 is initially prepared and upon completion of this operation the X-ray flash from the generator 1 is AC synchronously triggered, with the resulting flash having a duration of 10 ms at 50 cycles alternating current supply voltage.

Figure 2:
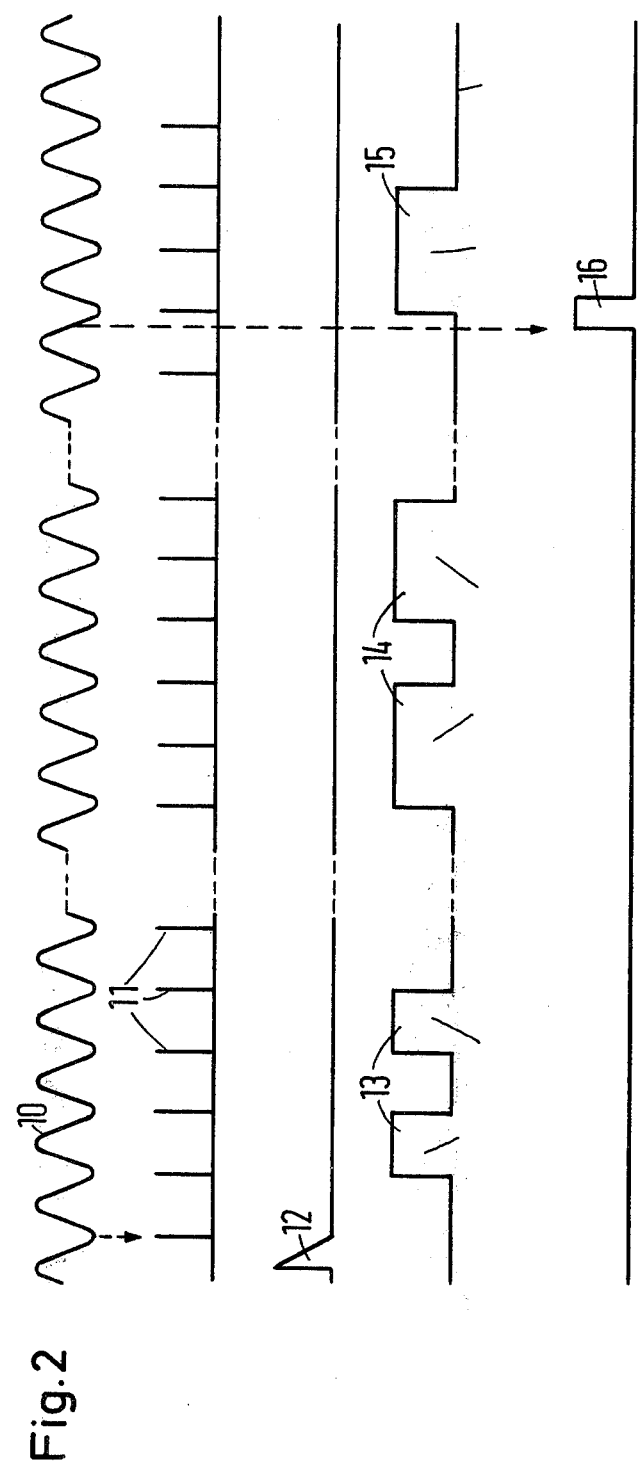
FIG. 2, is a pulse diagram of the examination operation in such a device.

The time diagram of FIG. 2 illustrates this sequence. In synchronization with the alternating current supply voltage 10 which supplies the electrical power for the entire device, the video pulse 11 of the TV camera 5 will be produced by the pulse generator 9. A start pulse 12, the triggering of which will be described in greater detail in connection with FIGS. 3 and 6 prepares the intermediate store 6, whereby the latter receives the entry-preparing pulses 13 and erasing pulses 14 for erasing a previously stored TV image. An X-ray flash 16 is then synchronously triggered by the alternating current supply voltage at the zero passage thereof. The resulting shadow image on the fluorescent screen 4 is picked up by the AC synchronized TV camera 5 and written into the store during the write-in period 15. The TV image thus written into the intermediate 6 can then be read out thereof for an arbitrarily long period, for example until the intermediate storage is once again prepared as a result of a new start pulse.

Figure 3:
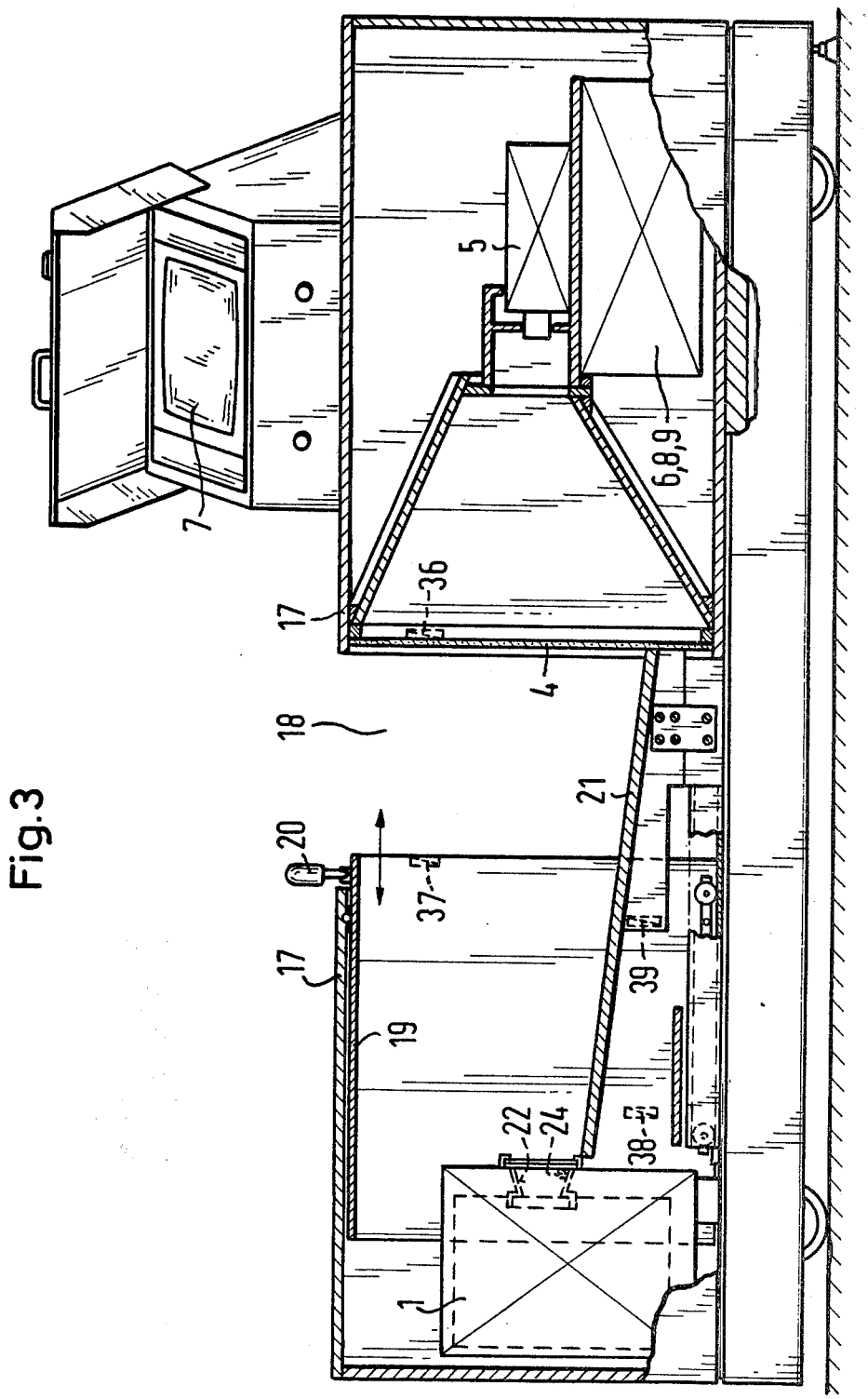
FIG. 3, is a longitudinal section through a exemplary construction of an inspection device in accordance with the present invention.

FIG. 3 illustrates an exemplary physical construction of a device having a circuit such as illustrated in FIG. 1, in which a housing 17 is provided which includes an inspection space 18, adapted to receive the inspection object to be fluoroscoped, with the space being enclosable by means of a shielding hood 19. All parts of the device, with the exception of the TV monitor, are located inside the housing, the interior of which is seamlessly sheathed with a lead foil 0.5 mm thick, whereby the housing effectively shields the surrounding environment from X-radiation. In the exemplary embodiment illustrated, the shielding hood 19 may be moved by means of a hand grip 20 although movement of the shield hood conceivably could be effected by suitable mechanical means.

As illustrated in FIG. 3, the floor 21 of the inspection space is constructed as an inclined plane with a downward slope toward the end of the housing containing the fluorescent screen 4. The inclination is so selected that it at least approximately coincides with the opening angle of the X-radiation 2 emitted by the X-ray flash generator 1. The sloping floor of the inspection space has the advantage, in addition to the fact that the piece of luggage cannot fall over, i.e. is always fluoroscoped standing up, that it prevents a shading of the X-radiation 2 by the base on which the inspection object 3 is to be placed.

The X-ray flash generator 1, disposed in the left-hand section of the housing, as viewed in FIG. 3, has a generally conical shaped beam outlet opening 22, at which an X-ray detector 24 is directly positioned. While any sensor reacting to X-radiation is suitable for use as the X-ray detector 24 a particular efficient one may comprise a photo-conductive cell which is provided with a layer of luminescent material that is sensitive to X-rays, for example zinc-cadmium sulphide.

Figure 4:
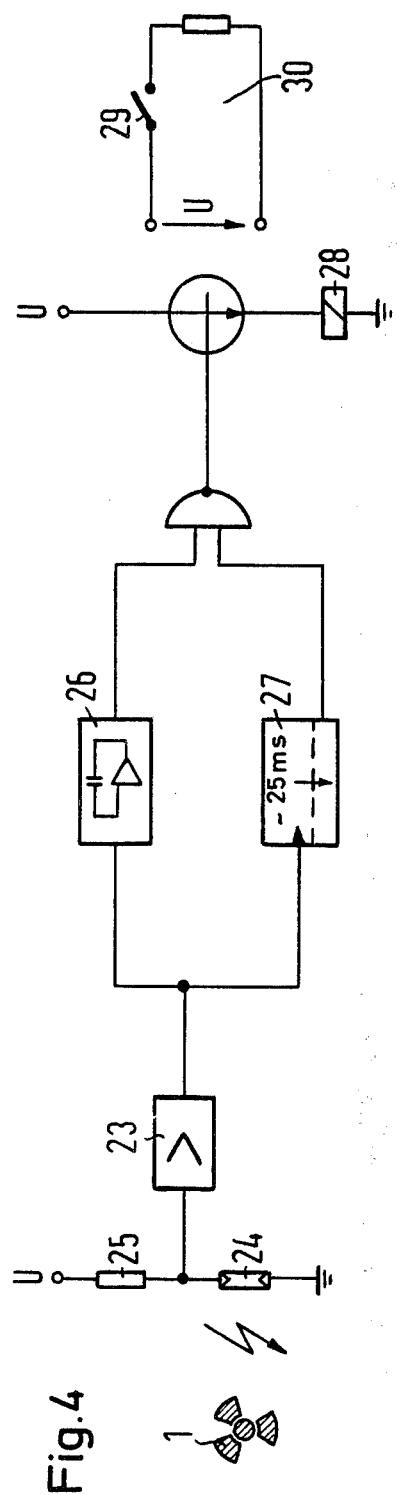
FIG. 4, is a circuit diagram, in block form, of an X-ray detector for a device such as illustrated in FIG. 3.
Figure 5:
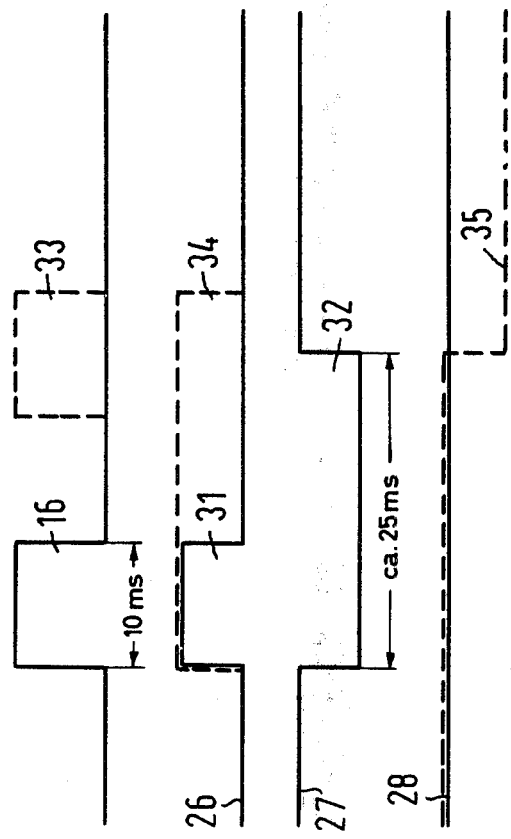
FIG. 5 is a pulse diagram for the explanation of the method of operation of the circuit of FIG. 4.

The circuitry and manner of the operation of the X-ray detector 24 will be apparent from a reference to FIGS. 4 and 5, which illustrate the X-ray detector 24 disposed in the beam path of the X-ray flash generator 1. During each emitted X-ray flash, the resistance value of the X-ray detector 24 will be decreased, as a result of which a short photo-current pulse can flow from the terminal U over the high resistance 25 and the X-ray detector 24. Such pulse is fed over a preamplifier 23 to an integration amplifier 26 and a timing member or circuit 27, which is so adjusted that the pulse will have subsided between two examination operations following at a normal interval. A relay 28 is adapted to be energized under the control of the integrated output voltage of the amplifier 26, for example over a suitable switching means 28' with the relay controlling the operation of contacts 29 disposed in the circuit 30 to the high voltage generation means of the X-ray flash generator 1. In the event, as indicated by extended lines, in FIG. 5, the duration of the X-ray flash 16, at a prescribed intensity, does not exceed a predetermined duration, in the present instance 10 ms, the output voltage 31 of the amplifier 26 in conjunction with the setting of the timing member 27 to a predetermined pulse length 32, of for example 25 ms, results in the relay 28 remaining de-energized and the contacts 29 closed. If, on the other hand, as a result of any error or breakdown in the electronic system of the device, a further X-ray flash occurs, as illustrated by the broken-line 33, an output voltage 34, also indicated by broken-lines, will occur. As a result of the voltage 34 at the output of the amplifier 26 and the voltage at the end of the pulse 32 a control voltage at the switching means 28' will result in energization of the relay winding 28 and opening of the contacts 29. Consequently, as a result of the co-operable action of the timing circuit 27 and the output of the amplifier 26, the high voltage U of the X-ray flash generator 1 will be switched off anytime the output voltage of the amplifier 26 exceeds the limiting values set by the timing circuit 27. The device thus cannot be again operated until the error has been found and corrected.

It will be appreciated that the circuit of FIG. 4 operates in the same manner, as above described, with respect to an undesired additional X-ray flash as illustrated in FIG. 5, in the event the intensity of the X-ray flash exceeds a certain quantity, since the increased intensity will result in a stronger stimulation of the X-ray detector and thus, as a result of effects, a longer photo current will exist whereby the relay 28 will again be operated when a value, as determined by the timing circuit 27, is exceeded. The X-ray detector 24, in conjunction with the circuit of FIG. 4 thus provides an overall safety, guaranteeing an absolute protection of the inspection object 3 with respect to irradiation of excessive intensity or excessive duration.

FIG. 3 also illustrates the use of a magnetically actuatable gas-protected contact 36 which triggers the start pulse 12 (FIG. 2) when the shielding hood 19 is completely closed. This is accomplished by means of a magnet 37 located adjacent the front face of the shielding hood 19 opposite the gas-protected contact 36, whereby upon closing motion of the shielding hood 19, the gas-protected contact 36 will be closed when the magnet 37 there abuts. The shielding hood 19 also carries a second magnet 38 which is remotely disposed from the magnet 37 and adapted to cooperate with a second gas-protected contact 39, carried by a stationary part of the device, which functions as a safety switch.

Figure 6:
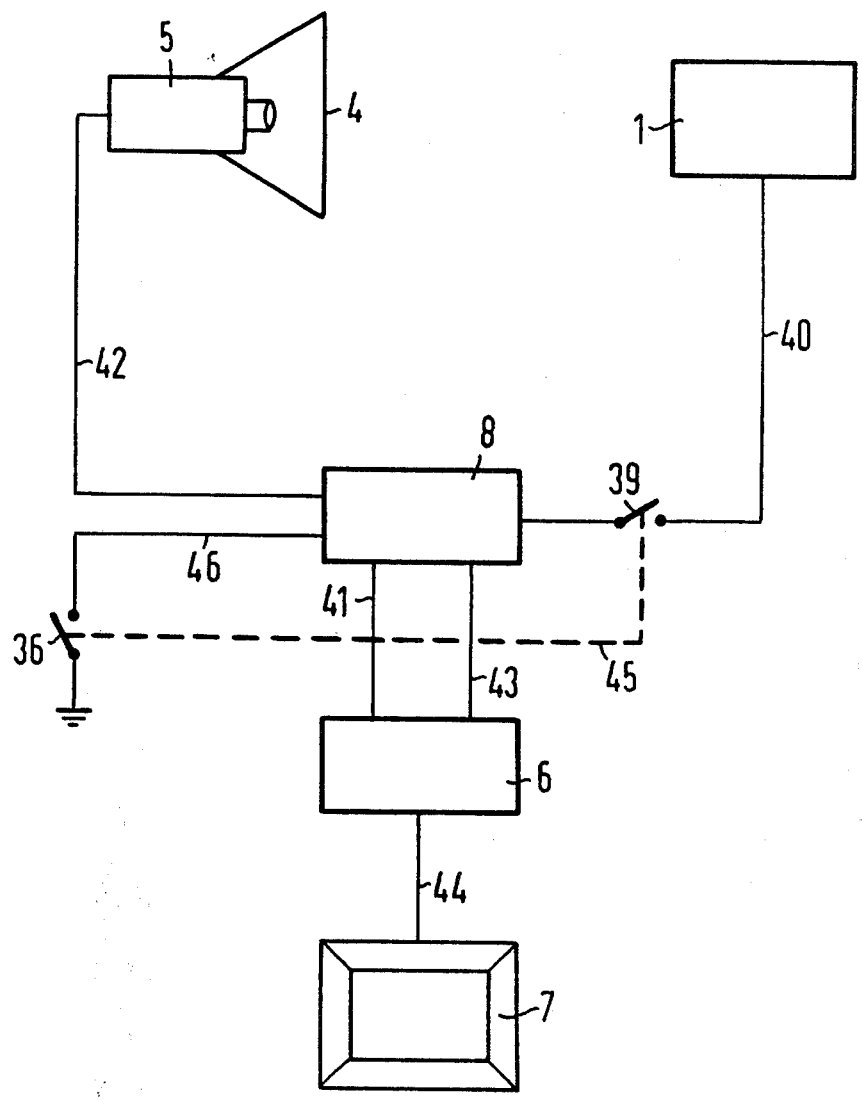
FIG. 6, is a circuit diagram of the general circuit of a device such as illustrated in FIG. 3, illustrating the triggering and safety switches associated therewith.

The operation of the respective switches will be apparent from a reference to the block diagram of FIG. 6, which diagram includes the same basic components of FIG. 1, namely the X-ray flash generator 1, TV camera 5, intermediate store 6, and TV monitor 7. The X-ray flash generator 1, TV camera 5 and intermediate store 6 are interconnected with the central contol unit 8 over control lines 40 and 41 or video signal lines 42 and 43, with reference numerals 44 designating a video signal line between the store 6 and the TV monitor 7. As long as the second gas-protected contact 39 is open the X-ray flash generator 1 cannot receive any operating voltage, whereby the entire device is electrically inoperable. During the closing movement of the shielding hood 19, the gas-protected contact 39 is closed when the magnet 38 is within operating distance therefrom and shortly thereafter, as inherently mechanically coupled in the closing movement (as indicated by the broken line 45 in FIG. 6) the gas-protected contact 36 will be closed. As a result, initially the gas-protected contact 39 operatively prepares the control line 40 prior to the actuation of the gas-protected contact 36, which is disposed at a different location point, and which triggers a start pulse over line 46, to the control unit 8 whereby the device becomes operative in accordance with the diagram of FIG. 2.

The invention is not limited to the specific sample embodiment illustrated in FIG. 3. Thus the arrangement of an X-ray detector or of a special magnetically actuated switch, while particularly desirable for a full protection device, are not necessarily required in conjunction with the rigid AC supply line coupling between the triggering of the X-ray flash generator in the zero passage of the AC supply line voltage and the TV picture scanning.

Having thus described our invention it will be obvious that although various minor modifications might be suggested by those versed in the art, it should be understood that we wish to embody within the scope of the patent granted hereon all such modifications as reasonably, and properly come within the scope of our contribution to the art.

We claim as our invention:

1. In a device for the inspection of objects, particularly luggage by means of X-rays emanating from an X-ray flash generator and passing through the object to be examined, to produce a shadow image on a fluorescent screen, which is received by a TV camera feeding an intermediate store, from which the stored video signals from the TV camera may be supplied to a TV monitor, and in which the X-ray flash generator, TV camera and intermediate store are interconnected by a control unit, the combination of the TV camera containing a pulse generator synchronized with the power supply line alternating current voltage, and the control unit being a synchronizing-unit rigidly coupling the line voltage to the TV camera and the X-ray flash generator, which synchronizing-unit, upon triggering of a start pulse initially prepares the intermediate store and thereafter triggers the X-ray flash synchronously with the supply line alternating current voltage.

2. A device according to claim 1, comprising in further combination, an X-ray detector disposed in the beam path of the X-ray flash generator, which X-ray detector triggers means for switching off the high voltage to the X-ray flash generator in the event the intensity and/or duration of the X-ray flash exceeds a predetermined value.

3. A device according to claim 2, wherein the X-ray detector 27 is a photo-conductive cell provided with a layer of X-ray-sensitive laminescent material, which photo-conductive cell is disposed at the beam outlet opening of the X-ray flash generator.

4. A device according to claim 1, wherein the inspection space is provided with a floor which slopes downwardly toward the fluorescent screen.

5. A device according to claim 4, wherein the slope of said floor coincides approximately with the corresponding beam dispersion angle of the X-radiation emitted by the X-ray flash generator.

6. A device according to claim 1, comprising a housing, shielding surrounding the environment from X-radiation and having an inspection space for receiving the inspection object, and a movable shielding hood for completely enclosing the inspection space during the time the inspection object is being fluoroscoped with X-rays.

7. A device according to claim 6, wherein the inspection space is provided with a floor which slopes downwardly toward the fluorescent screen.

8. A device according to claim 7, wherein the slope of said floor coincides approximately with the corresponding beam dispersion angle of the X-radiation emitted by the X-ray flash generator.

9. A device according to claim 4, wherein the housing is provided with at least one proximity switch, disposed for actuation by the movement of the shielding hood, which proximity switch is arranged to set the control unit into operation only when the shielding hood is in a fully closed position.

10. A device according to claim 9, wherein the inspection space is provided with a floor which slops downwardly toward the fluorescent screen.

11. A device according to claim 10, wherein the slope of said floor coincides approximately with the corresponding beam dispersion angle of the X-radiation emitted by the X-ray flash generator.

12. A device according to claim 4, wherein the housing is provided with a first proximity switch which is actuated by closing motion of the shielding hood to trigger a starting pulse at the moment of complete closure of the hood, and a second proximity switch operative to control the high voltage generator for the X-ray flash generator whereby the X-ray flash generator will be inoperative until immediately prior to the final closure of the shielding hood.

13. A device according to claim 12, wherein the inspection space is provided with a floor which slopes downwardly toward the fluorescent screen.

14. A device acording to claim 13, wherein the slope of said floor coincides approximately with the corresponding beam dispersion angle of the X-radiation emitted by the X-ray flash generator.

* * * * *